United States Patent [19]

Brickell et al.

[11] Patent Number: 4,845,749

[45] Date of Patent: Jul. 4, 1989

[54] SECURE TELECONFERENCING SYSTEM

[75] Inventors: Ernest F. Brickell, Morristown; Pil J. Lee, Somerville; Yacov Yacobi, Berkeley Heights, all of N.J.

[73] Assignee: Bell Communications Research, Inc., Livingston, N.J.

[21] Appl. No.: 135,917

[22] Filed: Dec. 21, 1987

[51] Int. Cl.[4] .............................................. H04L 9/04

[52] U.S. Cl. ........................................ 380/46; 380/47; 380/9

[58] Field of Search ................... 380/9, 33, 34, 43, 44, 380/46, 47

[56] References Cited

U.S. PATENT DOCUMENTS

| | | | |
|---|---|---|---|
| 3,089,921 | 5/1963 | Hines | 380/34 |
| 3,204,034 | 8/1965 | Ballard et al. | 380/34 |
| 4,264,781 | 4/1981 | Oosterbaan et al. | 380/46 |
| 4,308,617 | 12/1981 | German, Jr. | 380/34 |
| 4,411,017 | 10/1983 | Talbot | 380/43 |
| 4,555,805 | 11/1985 | Talbot | 380/43 |
| 4,750,205 | 7/1988 | Lee et al. | 380/9 |

*Primary Examiner*—Salvatore Cangialosi
*Attorney, Agent, or Firm*—James W. Falk

[57] ABSTRACT

A secure audio teleconferencing system is disclosed. The secure teleconferencing system comprises a centralized facility or bridge to which a plurality of participants is connected. The role of the bridge is to receive encrypted message signals from the participants and to add the encrypted message signals, modulo some known number. The result is then transmitted to the participants. Each participant is able to decrypt the modular sum of encrypted message signals, to obtain the desired ordinary sum of clear text message signals. In accordance with the invention, the message signals remain encrypted throughtout processing by the bridge. There are no non-encrypted messages.

23 Claims, 3 Drawing Sheets

SECURE TELECONFERENCING SYSTEM

FIELD OF THE INVENTION

The present invention relates to a secure teleconferencing system. More particularly, the present invention relates to an audio teleconferencing system including a central bridge for bridging encrypted audio signals without first decrypting them.

BACKGROUND OF THE INVENTION

A typical audio teleconferencing system comprises a centralized facility or bridge and a plurality of participant terminals connected to the bridge. Audio message signals produced by the individual participant terminals are encrypted at the participant terminals and transmitted to the bridge in encrypted form. These message signals are received and decrypted by the bridge. The clear text message signals are then processed by the bridge, for example, the clear text message signals are summed. The resulting signal is then encrypted at the bridge and transmitted from the bridge to the participant terminals where decryption takes place. Illustratively, the bridge could just add the speech signals from all the participants in the teleconference and broadcast the sum in encrypted form. However, this is generally not done because this would also add the background noise from all the participants and would require unnecessarily large dynamic range. In general, the bridge adds the message signals from a subset of the participants in the teleconference.

One shortcoming of the type of teleconferencing system described above is that the message signals are present in the bridge in clear text decrypted form. Such bridges are therefore not suitable for secure teleconferencing. Accordingly, it is an object of the present invention to provide a secure audio teleconferencing system utilizing a bridge for bridging encrypted audio signals without first decrypting them so that clear text message signals are not present at the bridge.

SUMMARY OF THE INVENTION

The present invention is a secure audio teleconferencing system. The secure teleconferencing system comprises a centralized facility or bridge to which a plurality of participant terminals is connected. Unlike prior art audio teleconferencing systems, there are no clear text message signals present at the bridge.

At each participant terminal clear text audio messages are encrypted by utilizing a modular arithmetic operation (such as modular addition and/or modular multiplication) to combine the message signal with a pseudo-random integer generated by a hard-to-invert but easily computable function. The encrypted messages from the participant terminals are transmitted to the bridge.

At the bridge the encrypted message signals from at least some of the participants are summed using modular addition and the resulting encrypted message sums are transmitted to the participant terminals. At the participant terminals decryption takes place to provide each terminal with the sum of the clear text message signals.

DETAILED DESCRIPTION

Before describing the audio teleconferencing system of the present invention, it may be helpful to briefly review a prior art audio teleconferencing systems. A prior art audio teleconferencing system is schematically illustrated in FIG. 1.

Figure 1:
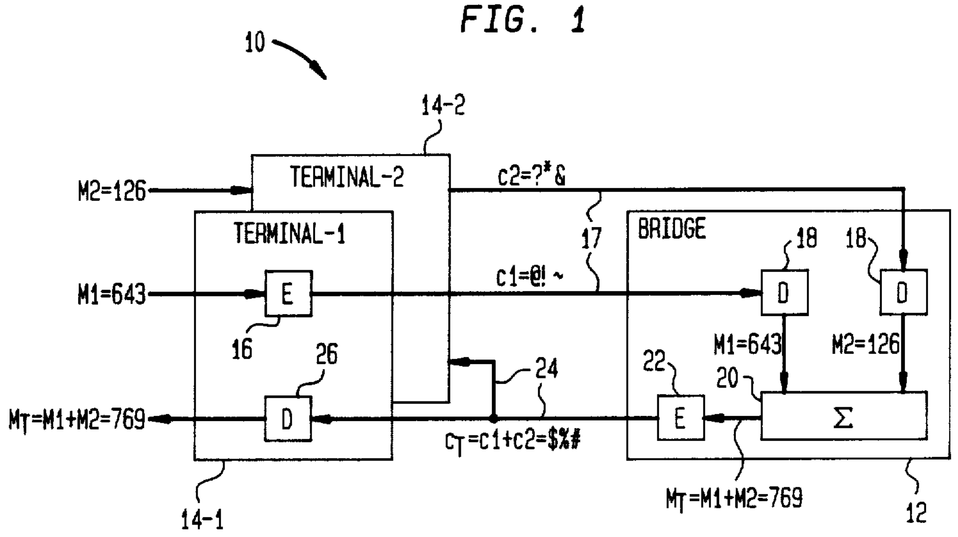
FIG. 1 schematically illustrates a prior art audio teleconferencing system.

The teleconferencing system 10 of FIG. 1 comprises a bridge 12 and a plurality of participant terminals 14-1, 14-2 . . . The purpose of the system 10 is to allow audio messages from individual terminals to be transmitted to all other terminals. Audio clear text message signals $M_1$, $M_2$ are encrypted at the terminals 14-1, 14-2, respectively, by means of encryption units 16 to produce the encrypted message signals $C_1$, $C_2$. The encrypted messages are transmitted from the terminals 14 to the bridge 12 via lines 17. At the bridge 12, the encrypted signals $C_1$, $C_2$ are decrypted by means of decryption units 18 to regenerate the clear text message signals $M_1$, $M_2$. The clear text message signals are then summed utilizing summing unit 20 to produce the clear text summed message signal $M_T=M_1+M_2$. The clear text signal $M_T$ is encrypted by means of encryption unit 22 to produce an encrypted signal $C_T=C_1+C_2$. The signal $C_T$ is broadcast to the terminals 14 via lines 24 where it is decrypted using decryption units 26 to reproduce the desired clear text signal $M_T$.

The conventional audio teleconferencing system of FIG. 1, which utilizes conventional cryptographic measures, provides for privacy against eavesdroppers who can intercept transmissions by tapping the lines 17, 24. However, because the bridge 12 processes only clear text messages, such conventional cryptographic measures may be worthless.

Figure 2:
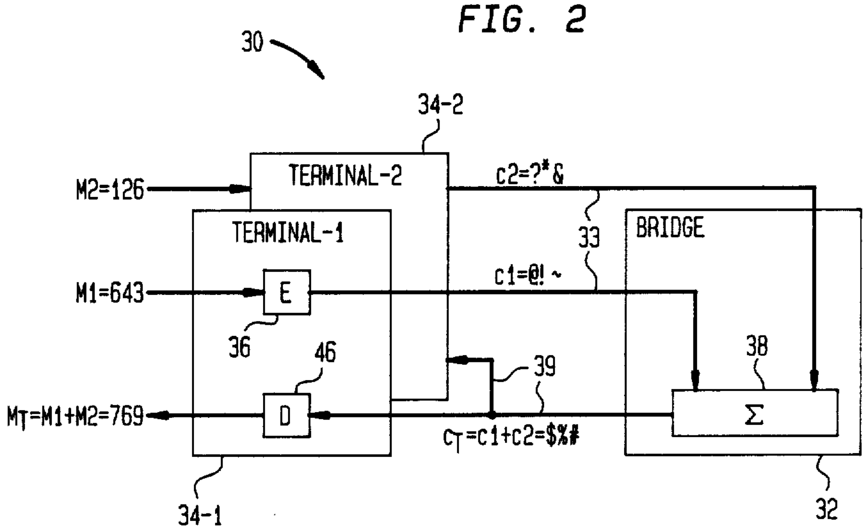
FIG. 2 schematically illustrates an audio teleconferencing system in accordance with an illustrative embodiment of the invention.

FIG. 2 schematically illustrates a secure audio teleconferencing system 30 in accordance with an illustrative embodiment of the present invention. The secure audio teleconferencing system 30 comprises terminals 34-1, 34-2 . . . . and a bridge 32 which processes encrypted messages. The clear text audio messages $M_1$ and $M_2$, from terminals 34-1 and 34-2, respectively, are encrypted using encryption units 36 to produce the encrypted messages $C_1$ and $C_2$. Specific encryption algorithms for use in connection with the system 30 are discussed below.

The encrypted message $C_1$ and $C_2$ are transmitted via lines 33 to the bridge 32 where they are summed by summing unit 38 to form the signal $C_T=C_1+C_2$. (As is explained below, the summing unit 32 actually calculates a modular sum). The signal $C_T$ is transmitted back to the terminals 34 via lines 39 for decoding using decoding unit 41 to produce the clear text signal $M_T=M_1+M_2$. No clear text message signals are present in the bridge.

Figure 3:
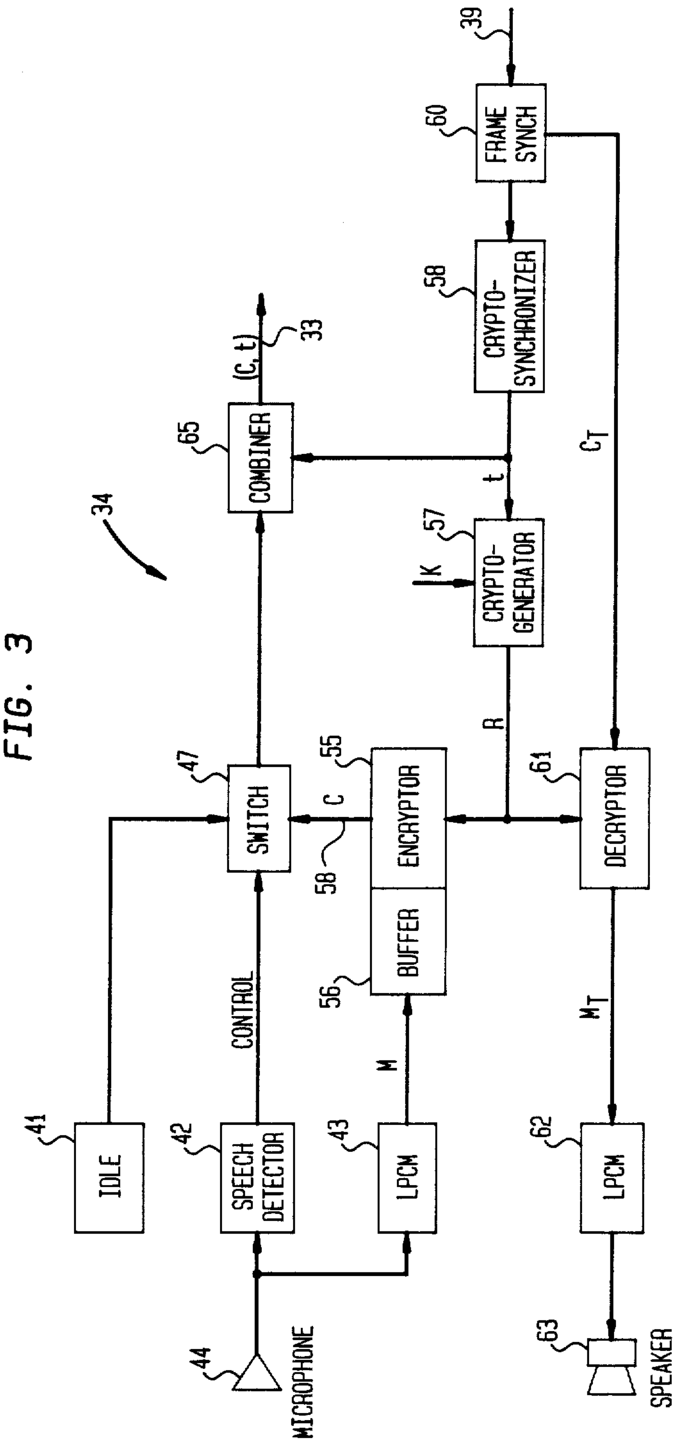
FIG. 3 schematically illustrates a participant terminal for use in the system of FIG. 2.

The specific encryption and decryption algorithms for use in connection with the system 30 of FIG. 3 are now discussed. Consider an audio teleconferencing system in which there can be up to N participants in a teleconference. The system can handle up to L $(L<N)$ simultaneous active speakers. Generally the number of active speakers at any one time is Q $(Q<L)$. Let $M_i$ and $C_i$ denote the clear text message and corresponding encrypted message of participant i at sample time t. The message space for the messages $M_i$ is the integers 0,1,2, . . . B. This means that the message $M_i$ must be one of the integers 0,1,2, . . . B. The function f is an easily computable function which is hard to invert. At each time t (t is used as a sync word), f will produce a pseudo-random integer mod P from a key. Examples of such functions include the DES (data encryption standard) function published in the *Federal Reqister* Vol. 40 No. 52, March 17, 1975 pp. 12,067 to 12,25O. P is an integer which is larger than the product of L and B. Five possible encryption and decryption algorithms for use in connection with the system 30 of FIG. 2 are described below.

(a) Distinct Key, Common Sync Additive Alqorithm

Participant i (i.e. one of the terminals 34 of FIG. 2) encrypts its message $M_i$ as $$C_i = f_{K_i}(t) + M_i \text{ Mod } P.$$

The key $K_i$ may be viewed as one argument or input of the function f. In this particular algorithm, each terminal i has a distinct key $K_i$. The bridge 32 computes by way of summing unit 38 and broadcasts back to the terminals 34 the signal $$C_T = \sum_{i=1}^{Q} C_i \bmod P$$

Each terminal decrypts by subtracting the sum of random numbers from the signal $C_T$ to produce the signal $M_T$. Thus $$M_T = C_T - \sum_{i=1}^{Q} f_{K_i}(t) \bmod P = \sum_{i=1}^{Q} M_i \bmod P = \sum_{i=1}^{Q} M_i$$

It should be noted that to use this particular encryption-decryption algorithm each terminal must know all of the keys $K_i$ of the other participants. These keys are generally distributed at the start of a teleconference. However, these keys should be unknown to any outside observer including the bridge. When this particular algorithm is used, the bridge needs to infrequently transmit the terminals information concerning the identity of particular Q terminals whose messages are involved in the sum $C_T$.

(b) Common-Key, Common Sync Additive System

This encryption-decryption algorithm is similar to the one discussed in section (a) above except that the pseudo-random number provided to the individual participants by the function f is the same since each participant uses a common key K and a common sync word t. Thus $$C_i = M_i + f_K(t) \bmod P, \text{ and}$$

$$C_T = \sum_{i=1}^{Q} (M_i + f_K(t)) \bmod P = \sum_{i=1}^{Q} M_i \bmod P + Qf_K(t) \bmod P$$

The bridge broadcasts $C_T$ to the participants as well as (infrequently) the value of Q. the individual participants compute $M_T$ as follows:

$$M_T = C_T - Qf_K(t) \bmod P = \sum_{i=1}^{Q} Mi \bmod P = \sum_{i=1}^{Q} Mi$$

The common key, common sync additive algorithm is less secure than the algorithm described in section (9) above since an eavesdropper needs to determine only one pseudo-random number to decrypt a set of messages comprising one message from each participant terminal. However, the common key algorithm is computationally simpler since the decryption process involves the calculation of one value of f. In addition, the amount of downstream side information to be broadcast by the bridge is reduced, since the bridge must only broadcast the number Q, not Q distinct ID's (c) Common-Key, Distinct-Sync Additive Algorithm In this algorithm, each transmitter uses a distinct ID as part of the sync word t, so that the resulting pseudo-random number produced by the function $f_K(t_i)$ is different for each terminal. The key K is the same for each participant. In this system $$C_i = M_i i + f_K(t_i) \bmod P. \text{ and}$$

$$C_T = \left( \sum_{i=1}^{Q} Mi + f(t_i) \right) \bmod P$$

The bridge broadcasts CT to the participant terminals along with (infrequently) the active user (ID's) comprising the sync words. Each user terminal calculates $M_T$ from $C_T$ as follows:

$$M_T = C_T - \sum_{i=1}^{Q} f_K(t_i) \bmod P.$$

(d) Common-Key, Common Sync Multiplicative System

In this algorithm $$C_i = M_i \cdot f_K(t) \bmod P$$

Here P must be a prime number and zero is excluded from $f_K(t)$ since $f_K(t)$ needs to have an inverse modulo P. The bridge sums the signals $C_i$ to form the signal $C_T$ as follows:

$$C_T = \sum_{i=1}^{Q} C_i \bmod P = \sum_{i=1}^{Q} [M_i \cdot f_K(t) \bmod P] \bmod P$$

Decryption is performed at the user terminals by multiplying the total cryptogram $C_T$ by $f_K(t)^{-1}$ mod P to produce $M_T$. This system has the advantage that no side information such as participant ID's or number of active users has to be transmitted from the bridge to the user terminals.

(e) Combined Additive and Multiplicative System

The additive and multiplicative systems above may be combined as follows. Each terminal can produce a $C_i$ such that $$C_i = M_i f_K(t_0) + f_K(t_1) \bmod P$$

From $C_T$ each terminal first subtracts $Q \cdot f_K(t_1)$ and then multiplies $f_K(t_0)^{-1}$ to obtain $M_T$.

The signal $$M_T = \sum_{i=1}^{Q} M_i \bmod P$$

obtained at the terminals of each systems is equal to the regular summation $$\sum_{i=1}^{Q} M_i,$$

since $M_T$ is less than the the product of L and B which is, again, less than P.

For a potential eavesdropper to break into a teleconferencing system 30 which uses one of the encryption-decryption algorithms described above, the eavesdropper must figure out the values of the function $f_K(t)$ (in the case of an additive system) or the inverse $f_K^{-1}(t)$ in the case of a multiplicative system. For this reason, the function $f_K(t)$ is chosen so that it comprises a cryptographically strong pseudo-random number generator. This means that knowing the history of the pseudo-random sequence one cannot infer, using polynomially bounded resources the next bit with probability significantly higher than $\frac{1}{2}$. Sequence generators with the above property exist if one-way functions exist, i.e., easily computable functions which are hard to invert on a non-negligible portion of their target. An example of a suitable function is the above-mentioned DES function.

Of the five encryption-decryption algorithms mentioned above, the most secure are distinct key and distinct sync algorithms since to break the encryption, an eavesdropper must simultaneously find out a plurality of values of f since each participant terminal, through use of a distinct key or distinct sync word, encrypts using a distinct value of f. The common-key, common sync systems are less secure, although they are computationally less complex. Such tradeoffs between degree of security and degree of computational complexity should be decided based on the intended environment of the teleconferencing system.

For any additive only system a "bad" bridge can add a clear message $M_0$ to $M_T$ so that the clear message can be heard by all the conferees, while for any multiplicative system such a sabotage does not work. More particularly, the clear text message $M_0$ can be added in the bridge so that the signal $C_T+M_0$ is broadcast to the participant terminals. Since decryption involves only subtraction, the participant terminals produce the clear text message $M_T+M_0$.

FIG. 3 schematically illustrates a participant terminal 34 for use in the teleconferencing system 30 of FIG. 2. The terminal of FIG. 3 implements a common key, common sync additive encryption-decryption algorithm of the type described above.

In the user terminal 34 of FIG. 3 a microphone 44 produces an audio analog signal from audible speech. The audio signal is detected by speech detector 42 and is digitally coded by way of linear pulse code modulator 43 or any other modulator which is approximately linear. Switch 47 is a switch which chooses to transmit an idle signal (i.e. a signal which indicates no speech is present at terminal 34) generated by idle signal generator 41 or an encrypted message. The switch 47 is controlled by the speech detector 42.

A clear text message signal M produced by the linear pulse code modulator 42 is encrypted by means of encryption unit 55. The encryption unit 55 includes a buffer 56. The inputs to the encryption unit are a clear text message signal M and a pseudo-random number R which is generated by the function $R=f_K(t)$. As indicated above, the encrypted message C is produced on line 58 as a result of the encryption unit 55 using a modular arithmetic operation (e.g. modular addition) to combine the clear text message M with the pseudo-random number $R=f_K(t)$, Generator 57 generates the pseudo-random number R. The inputs to the t. The sync word t is generated by the crypto-synchronizer 58. The crypto-synchronizer retrieves noisy synchronization information which is one-level above frame synchronization, and outputs the error free synchronization word t to both the generator 57 and the combiner 65. The crypto-synchronizer insures that the terminal 34 has the same sync word t as all of the other participants in the teleconference. The combiner 65 combines the output of switch 47 (either an encrypted message or an idle signal) with sync information from the crypto-synchronizer 58 for transmission to the bridge 32 of FIG. 2 via line 33. Signals are received at the terminal 34 from the bridge 32 via line 39 which enters the frame synchronizer 60. The frame synchronizer 60 provides noisy synchronization information to crypto-synchronizer 58 and encrypted messages to the decryption unit 61. The inputs to the decryption unit 61 are the encrypted message $C_T$ and the pseudo-random number $R=f_K(t)$ produced by the generator 57. The decryptor outputs the clear text message MT which is converted into an analog audio signal by linear pulse code demodulator 62. The analog audio signal is converted to audible speech by way of speaker 63.

Figure 4:
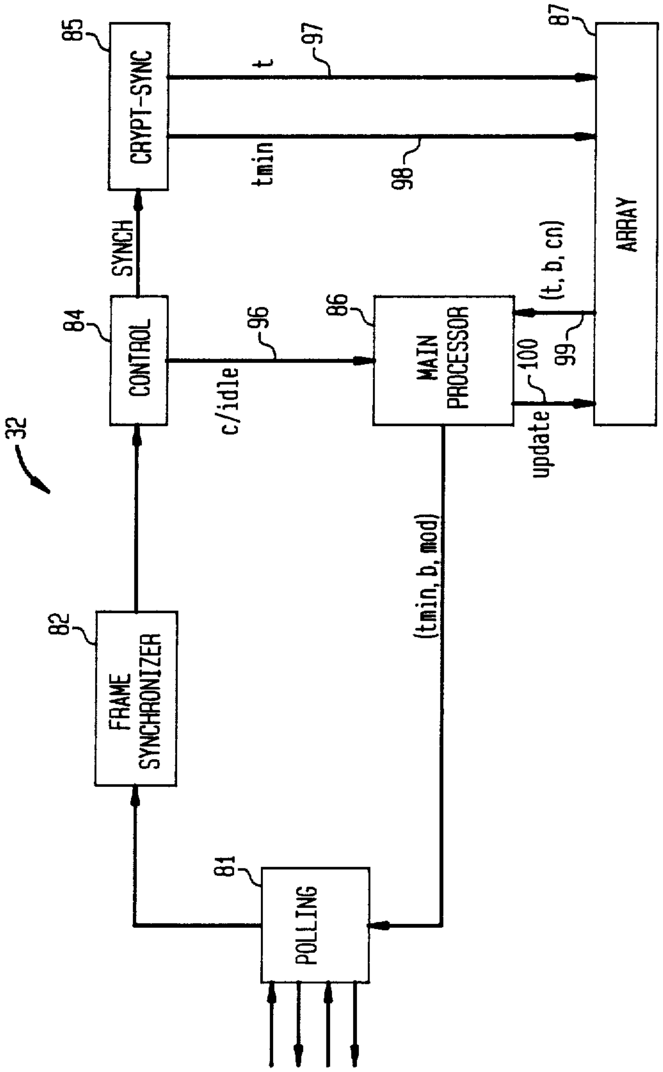
FIG. 4 schematically illustrates a bridge for use in the system of FIG. 2.

FIG. 4 illustrates the bridge 32 of FIG. 2 in greater detail. The bridge comprises a polling unit 81 which systematically polls all terminals 34 and a frame synchronizer 82. The controller 84 looks at data received from one of the terminals by way of polling unit 81 and the frame synchronizer 82 and locates the sync data and the encrypted message or idle signal. The sync data is sent to the crypto-synchronizer 85 and the encrypted message or idle signal is sent to the main processor 86 via line 96. The crypto-synchronizer handles synchronization of all terminals 34. For each terminal, in turn, the crypto-synchronizer 85 receives noisy synchronization information and outputs via line 97 the full synchronization word t free of errors. The crypto-synchronizer 85 also outputs via line 98 the crypto-synch word t-min of the message $C_T$ to be broadcast from the bridge 32 to the terminals 34.

The main processor 86 receives via line 96 either an idle signal or an encrypted message C. From the array 87, the main processor receives via line 99 the contents of the cell having the value t which is equal to the value of t outputted by the crypto-synchronizer on line 97. In other words, the value t serves to index a particular cell in the array 87. The contents of the cell transmitted via line 99 to the main processor is a tuple of the form (t, b, count) where count is the number of encrypted messages already summed, and b- is the partial modular summation of the encrypted messages. The main processor serves to use data supplied via line 96 from the control 84 to update b and count. The updated tuple is returned to the array via line 100.

Let Q be the number of simultaneous active speakers whose encrypted messages are added to form the encrypted message $C_T$ broadcast from the bridge 32 to the terminals 34. ($Q \leq L$, where L is the maximum number of simultaneous speakers). If count=Q, the main processor 86 avoids adding additional signals to b, at which point $b=C_T$.

At the end of a round of polling the main processor 86 accesses the cell containing t-min and $C_T$ and transmits this information to all terminals 34 via the polling unit 81.

Finally, the above described embodiments of the invention are intended to be illustrative only. Numerous alternative embodiments may be devised by those skilled in the art without departing from the spirit and scope of the present invention.

What is claimed is:

1. A method for enabling the secure exchange of messages in a multi-party communications system comprising generating message signals at a plurality of participant terminals, encrypting said message signals at each of said terminals by utilizing at least one modular arithmetic operation to combine each of the message signals with at least one pseudo-random number, transmitting said encrypted message signals to a bridge, and processing said encrypted message signals at said bridge without decryption by combining encrypted message signals from at least some of said participant terminals to form a resultant encrypted message signal.

2. The method of claim 1 wherein said resultant encrypted message signal is broadcast from said bridge to said terminals.

3. The method of claim 1 wherein said message signals are digitized audio signals.

4. The method of claim 1 wherein said modular arithmetic operation is modular addition.

5. The method of claim 1 wherein said modular arithmetic operation is modular multiplication.

6. The method of claim 1 wherein each of said message signals is encrypted utilizing first and second modular arithmetic operations involving first and second pseudo-random numbers.

7. The method of claim 1 wherein said step of processing said encrypted signals at said bridge comprises the step of summing said encrypted message signals from at least some of said participant terminals without decryption.

8. The method of claim 7 wherein said sum of encrypted message signals is broadcast to said terminals, and at said terminals, said sum of encrypted message signals is decrypted to produce a sum of clear text message signals.

9. A secure teleconferencing system comprising:

a plurality of participant terminals and a bridge, each of said participant terminals comprising means for generating a message signal, means for generating a pseudo-random number, and means for encrypting the message signal by combining the message signal with the pseudo-random number utilizing a modular arithmetic operation, and said bridge comprising means for receiving encrypted message signals from said participant terminals, means for processing the encrypted message signals from at least some of said participant terminals without decryption to form a resultant encrypted signal, and means for broadcasting said resultant encrypted signal to said participant terminals.

10. The system of claim 9 wherein each of said participant terminals further includes means for decrypting the resultant encrypted signal received from said bridge.

11. The system of claim 9 wherein said processing means comprises means for summing the encrypted message signals from at least some of said participant terminals by means of modular addition.

12. The system of claim 9 wherein said message signals are digitized audio signals.

13. The system of claim 9 wherein said pseudo-random number generating means in each of said terminals has a key input.

14. The system of claim 13 wherein the pseudo-random number generating means in each of said terminals has a distinct key input.

15. The system of claim 13 wherein the pseudo-random number generating means in each of said terminals has a common key input.

16. The system of claim 9 wherein said pseudo-random number generating means in each of said terminals has a sync input.

17. The system of claim 16 wherein the pseudo-random number generating means in each of said terminals has a common sync input.

18. The system of claim 16 wherein the pseudo-random number generating means in each of said terminals has a distinct sync input.

19. A terminal for use in a secure multi-party telecommunications system including a plurality of terminals and a bridge, said terminal comprising:

means for generating a message signal, means for generating a pseudo-random number, means for encrypting said message signal using a modular arithmetic operation to combine said message signal with said pseudo-random number, means for transmitting said encrypted message to said bridge, and means for decrypting a signal received from said bridge comprising a plurality of encrypted message signals.

20. The terminal of claim 19 wherein said pseudo-random generating means uses the data encryption standard function to generate said pseudo-random number.

21. A terminal for use in a secure audio teleconferencing system including a plurality of terminals and a bridge, said terminal comprising microphone means for generating an analog audio message signal, linear encoding means for digitizing said message signal, generator means for generating a pseudo-random number in response to a key input and a sync word input, means for encrypting said digitized message signal by using a modular arithmetic operation to combine said digitized message signal and said pseudo-random number, means for transmitting said encrypted message signal to said bridge, and means for decrypting a signal received from said bridge comprising a plurality of encrypted message signals.

22. A bridge for use in a secure multi-party telecommunications system comprising a plurality of participant terminals and said bridge, said bridge comprising:

means for receiving encrypted message signals from said participant terminals, means for utilizing modular addition to combine the encrypted message signals from at least some of said participant terminals without decrypting said message signals to form a total encrypted message signals, and means for broadcasting said total encrypted message signal to said participant terminals.

23. A method for enabling the exchange of message signals in a multi-party communications system comprising the steps of encrypting said message signals by utilizing at least one modular arithmetic operation to combine each of said message signals with at least one pseudo-random number, combining at least some of said encrypted messages without decryption to form a resultant encrypted message signal and decrypting said resultant encrypted message signal to form a signal comprising a plurality of clear text message signals.

* * * * *

UNITED STATES PATENT AND TRADEMARK OFFICE
CERTIFICATE OF CORRECTION

PATENT NO. : 4,845,749

DATED : July 4, 1989

INVENTOR(S) : Ernest F. Brickell, Pil J. Lee, and Yacov Yacobi

It is certified that error appears in the above-identified patent and that said Letters Patent is hereby corrected as shown below:

Column 3, line 16, "Alqorithm" should read --Algorithm--;
line 21, "$C_i = f_{K_i}(t) + M_i$ Mod P" should read --$C_i = f_{K_i}(t) + M_i$ mod P--;

Column 5, line 2, "multiplies" should read --multiplies by--;
line 9, "each systems" should read --each of the above systems--.

Signed and Sealed this

Twenty-fifth Day of August, 1992

*Attest:*

DOUGLAS B. COMER

*Attesting Officer* *Acting Commissioner of Patents and Trademarks*